United States Patent [19]

Toyama et al.

[11] Patent Number: 5,061,954
[45] Date of Patent: Oct. 29, 1991

[54] AUTOMATIC FOCUS ADJUSTMENT SYSTEM

[75] Inventors: Masamichi Toyama; Akihiro Fujiwara; Hirofumi Suda, all of Kanagawa; Kuniniko Yamada, Tokyo; Masahide Hirasawa; Kitahiro Kaneda, both of Kanagawa, all of Japan

[73] Assignee: Canon Kabushiki Kaisha, Tokyo, Japan

[21] Appl. No.: 534,676

[22] Filed: Jun. 7, 1990

[30] Foreign Application Priority Data

Jun. 9, 1989 [JP] Japan .................................. 1-148000

[51] Int. Cl.⁵ ...................... G03B 13/36; H04N 5/232
[52] U.S. Cl. ..................................... 354/402; 358/227
[58] Field of Search ....................... 354/400, 402, 403; 358/227; 352/140; 350/430

[56] References Cited

U.S. PATENT DOCUMENTS 4,592,638 6/1986 Koneda et al. ................. 358/227 X
4,611,244 9/1986 Hanma et al. ......................... 358/227
4,660,954 4/1987 Fujita et al. ......................... 354/403
4,825,237 4/1989 Hatase et al. ........................ 354/402

Primary Examiner—W. B. Perkey
Attorney, Agent, or Firm—Robin, Blecker, Daley & Driscoll

[57] ABSTRACT

An automatic focus adjustment system comprises a focusing device which varies an image forming position; and a control circuit which is capable of setting first and second focusing modes. In the first focusing mode, the control cirucit causes the focusing device to move to an in-focus point within its morning area. In the second focusing mode, the control circuit causes the focusing device to move to an in-focus point on the nearest focusing distance side. The control circuit is arranged to divide a moving range of the focusing device into a first area and a second area which is set on the nearest focusing distance side of the first area to make the focusing device movable within the first area in the first focusing mode, and to make it movable within both the first and second areas in the second focusing mode.

25 Claims, 7 Drawing Sheets f: FOCAL LENGTH
F: APERTURE VALUE

AUTOMATIC FOCUS ADJUSTMENT SYSTEM

Background of the Invention

1. Field of the Invention

This invention relates to an automatic focus adjustment system and more particularly to an automatic focus adjusting system which uses a video signal and is advantageously adapted for a video camera or the like.

2. Description of the Related Art

A video camera or the like has been generally arranged to be focusable on objects located away from the camera within a range from the nearest distance of about 1.2 m to an infinite distance.

Meanwhile, the recent popularization of home video cameras as consumer appliances has increased the occasions of picture shooting within a relatively narrow space. As a result, the desire of users has increased for a video camera that permits shooting at a closer distance than the nearest focusing distance of 1.2 m. To meet this requirement, the nearest focusing distance can be shortened up to 0.6 m or thereabout by designing the lens of the video camera to double the conventional focusing-lens movable degree.

Further, a so-called rear focus lens type which has the focusing lens disposed in the rearwardmost position within a zoom lens permits the nearest focusing distance position to be located just before the zoom lens.

It is necessary for a video camera in recent years to have an automatic focusing function. The automatic focusing action must be adequately carried out even when the camera is set at the nearest focusing distance. However, with the nearest focusing distance of the optical system shortened as mentioned above, there arise some problems.

In the first place, the responsivity of the automatic focusing device to the movement of the lens within the whole lens moving range degrades as the focusing lens must be moved to a greater degree for the purpose of shortening the nearest focusing distance. For example, assuming that a length of time of 3 sec is required in moving the lens for focusing with the camera operated by panning from the infinitely distant point to an object located at the nearest focusing distance of 1.2 m, a length of time of 6 sec which is twice as long as the above-stated time would be required with the nearest focusing distance arranged to be 0.6 m. However, the increased length of time deteriorates the operability of the camera and thus presents a problem in terms of practicability.

A second problem lies in a faulty action of the focusing device resulting from a spurious resolution of the lens. When the focal point of the lens is shifted, an image is formed with phasic deviation of 180 degree for an object having a high spatial frequency. This is called the spurious resolution. In the case of the automatic focusing device using a video signal, the lens is determined to be in focus when a high-frequency component of the video signal reaches its maximum value. According to this method, the high-frequency component is considered to have reached a maximum value even when it has the spurious resolution. In such a case, the device would determine the lens to have reached an in-focus state and bring the movement of the lens to a stop despite the spurious resolution. This trouble more often takes place as the defocus degree of the lens increases. Although this trouble may not take place where the nearest focusing distance is set at 1.2 m like in the case of the conventional camera, the spurious resolution is likely to take place to bring the movement of the lens position to a stop despite its out-of-focus state in cases where the nearest focusing distance is arranged to be 0.6 m.

SUMMARY OF THE INVENTION

This invention is directed to the solution of the above-stated problems.

It is, therefore, a first object of the invention to provide an automatic focus adjustment system which is capable of always accurately and speedily performing focus adjustment irrespectively of the object distance.

It is a second object of the invention to provide an automatic focus adjustment system which is capable of smoothly operating in any of different focusing modes.

It is a third object of the invention to provide an automatic focus adjustment system which is capable of stably, smoothly and speedily carrying out automatic focus adjustment either within an ordinary area or within a near distance area (macro area).

Under this object, an automatic focus adjustment system arranged according to this invention as a preferred embodiment thereof comprises: focus adjusting means for varying an image forming position; and control means for selectively setting a first focusing mode in which the focus adjusting means is moved to an in-focus point within a moving area thereof on the basis of a signal according to the degree of focusing and a second focusing mode of nearest-focusing-distance-side priority in which the focus adjusting means is moved to an in-focus point while being driven toward the nearest focusing distance side. In this embodiment, a moving range of the focus adjusting means is divided into a first area and a second area. The second area is set on the nearest focusing distance side of the first area. The control means is arranged to make the focus adjusting means movable within the first area in the first focusing mode and within the first area and the second area in the second focusing mode.

It is a fourth object of the invention to provide an automatic focus adjustment system which is capable of always setting an optimum focusing mode by forcibly shifting one focus adjusting mode to another when no in-focus state is attainable in the one focusing mode.

Under that object, an automatic focus adjustment system arranged according to this invention as a preferred embodiment thereof comprises: focus adjusting means for adjusting focus by varying an image forming position on the basis of a signal according to the degree of focusing; switching means for switching a moving range of the focus adjusting means between a first moving area and a second moving area which is set on the nearest focusing distance side of the first moving area; and means for forcibly shifting the focus adjusting means from the first moving area to the second moving area.

It is a fifth object of the invention to provide an automatic focus adjustment system which is arranged to be capable of easily and reliably selecting a focusing mode from among a plurality of focusing modes which have different focus adjusting ranges.

Under this object, an automatic focus adjustment system arranged according to this invention as a preferred embodiment thereof comprises: focus adjusting means which is movable in first and second areas to adjust focus by varying an image forming position;

detecting means for detecting one area of the first and second areas in which the focus adjusting means is located; and control means for controlling the focus adjusting means in such a manner that, when the detecting means has detected that the focus adjusting means has shifted from one area of the first and second areas to the other area and when the focus adjusting means has been held in the other area for a predetermined period of time or more, the focus adjusting means adjusts focus while moving in the other area.

It is another object of the invention to provide an automatic focus adjustment system which is arranged to be not only capable of performing automatic focus adjustment within an ordinary distance range like the conventional system but also capable of accurately and speedily performing focus adjustment within an extremely near distance range without requiring any complex operation.

It is a further object of the invention to provide an automatic focus adjustment system which is capable of promptly and accurately performing focus adjustment by detecting the distance range within which a focusing lens is currently located and by performing focus adjustment appositely to the detected distance range.

It is a still further object of the invention to provide an automatic focus adjustment system which is arranged to divide a moving range of a focusing lens into an ordinary area for an ordinary focusing action and a near distance area for covering nearer focusing distances than the ordinary area; and to be capable of switching a focusing mode thereof from use of one of the two areas over to the other according to shooting conditions, so that automatic focus adjustment can be accomplished in an optimum manner according to the shooting conditions even in the event of a spurious resolution or the like and even for an object located at the nearest focusing distance.

These and other objects and features of the invention will become apparent from the following detailed description of embodiments thereof taken in connection with the accompanying drawings.

DETAILED DESCRIPTION OF THE PREFERRED EMBODIMENTS

Figure 1:
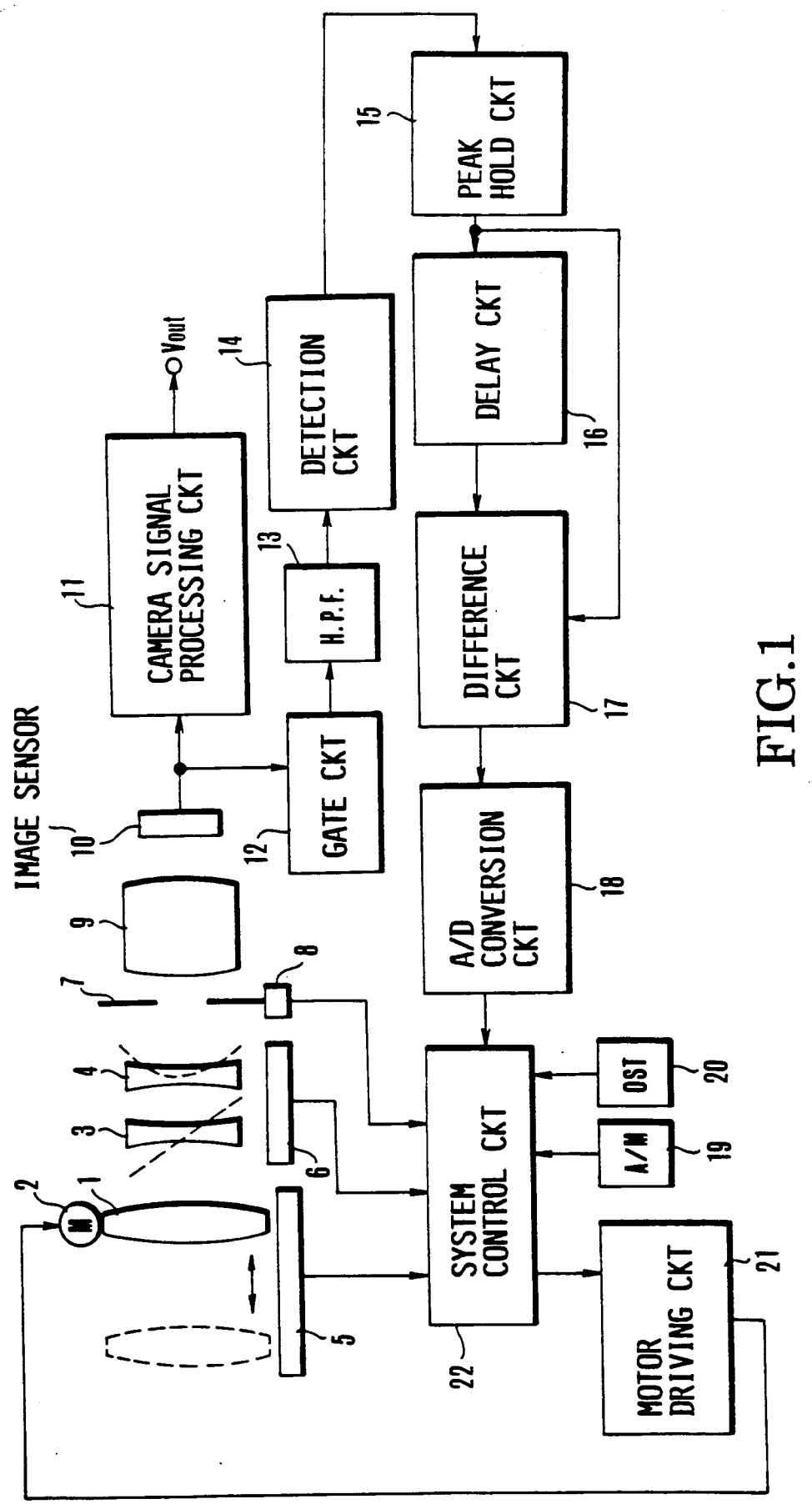
FIG. 1 is a block diagram showing by way of example the arrangement of a video camera to which the focus adjustment system of this invention is applied.
Figure 2:
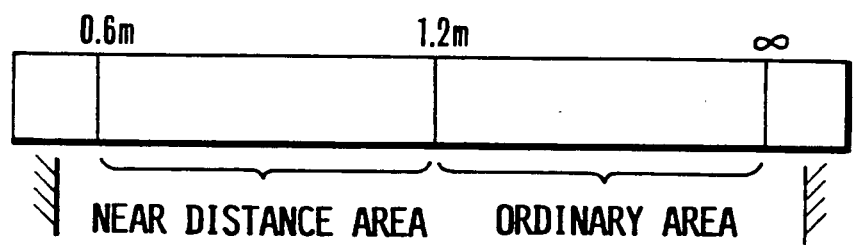
FIG. 2 illustrates moving areas of the focusing lens.

The following describes in detail an automatic focus adjustment system embodying this invention with reference to the accompanying drawings:

Referring to FIG. 1 which is a block diagram showing the arrangement of the automatic focus adjustment system, a focusing lens group 1 (hereinafter referred to as a focusing lens) is arranged to be used for focus adjustment. The focusing lens 1 is movable by means of a motor 2 to focus on an infinite distance position through the nearest focusing distance position which corresponds, for example, to a distance of 0.6 m from the lens. A focus encoder 5 is arranged to detect the moved position of the focusing lens 1. FIG. 2 shows the moving areas of the focusing lens 1. The moving areas allotted to the focusing lens 1 include an ordinary area ranging from an infinite distance $\infty$ to a focusing distance 1.2 m, and a near distance area for a focusing distance range from 1.2 m to 0.6 m as will be further described later. A reference numeral 3 denotes a variator lens and a numeral 4 a compensator lens. Zooming is arranged to be performed along a cam locus indicated by a broken line. A zoom encoder 6 is arranged to detect a focal length obtained by zooming.

An iris unit 7 is arranged to adjust the quantity of light incident on an image sensor 10. An aperture encoder 8 is arranged to detect the aperture position of the iris unit 7. A numeral 9 denotes a master lens. The image sensor 10 is composed of a CCD or the like and is arranged to produce a video signal by converting into the video signal an object image formed on the image sensing plane thereof. A camera signal processing circuit 11 is arranged to perform, on the video signal output from the image sensor 10, processing actions including a gamma correction process, a blanking process, a synchronizing signal adding process, etc., and to produce a video signal which is in conformity to the specifications of, for example, the NTSC color system.

A gate circuit 12 is arranged to perform a gating action on the video signal output from the image sensor 10; to set a focus detection area on the image sensing plane of the image sensor 10; and to pass only a signal part that corresponds to the detection area. A high-pass filter (hereinafter referred to as HPF) 13 is arranged to extract, from the video signal part which corresponds to the focus detection area and is extracted by the gate circuit 12, a high-frequency component to be used for focus detection. A detection circuit 14 is arranged to check the high-frequency component output from the HPF 13 and to produce a DC level signal. A peak hold circuit 15 is arranged to hold the peak value of the output level of the detection circuit 14 obtained during one field period. A delay circuit 16 is arranged to delay the output of the peak hold circuit 15 for the period of one field. A difference circuit 17 is arranged to compare the current output of the peak hold circuit 15 with the previous output of the peak hold circuit 15 obtained one field period before and to produce a signal indicative of a difference between the two outputs. An A/D (analog-to-digital) conversion circuit 18 is arranged to convert the analog signal output from the difference circuit 17 into a digital signal. An automatic/manual change-over switch (hereinafter referred to as an A/M switch) 19 is arranged to select either an automatic focusing mode or a manual focusing mode. FIG. 1 further shows a one-shot focusing switch (hereinafter referred to as an OST switch) 20; and a motor driving circuit 21 which is arranged to drive the focusing lens driving motor 2 according to the instructions of a system control circuit 22 as will be further described later. The system control circuit 22 is arranged to receive the encoder information of varied kinds from the focus encoder 5, the zoom encoder 6 and the aperture encoder 8, a focus signal output from the A/D conversion circuit 18 according to the degree of focusing and also operation instructions from the A/M switch 19 and the OST switch 20; to perform a computing operation on these information inputs; and to produce and supply a control signal to the motor driving circuit 21 for controlling the focusing lens driving motor 2. The system control circuit 22 includes a mircoprocessor.

Figure 3:
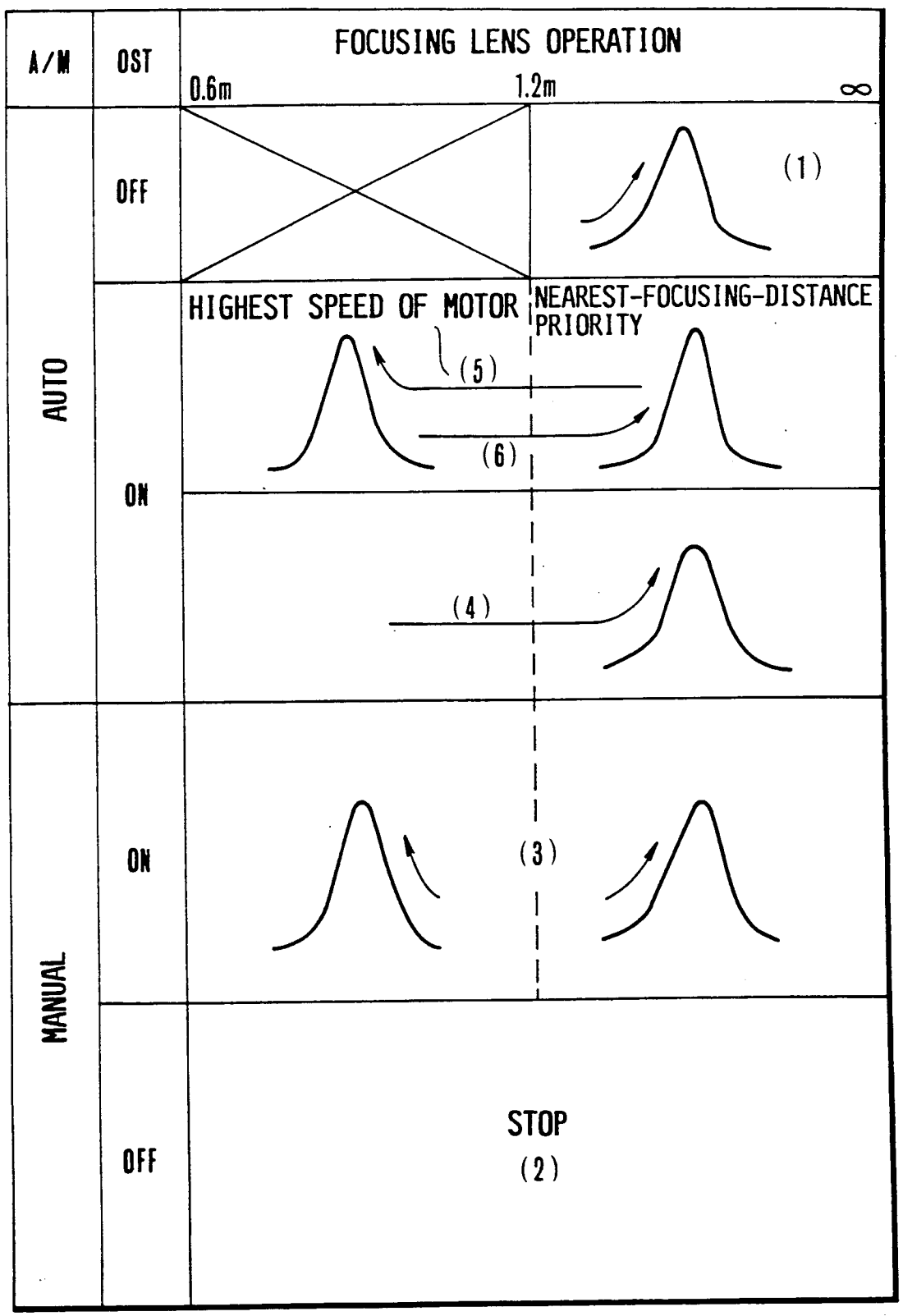
FIG. 3 shows the operation patterns of the focusing lens obtained in each of different focus adjusting modes.
Figure 4:
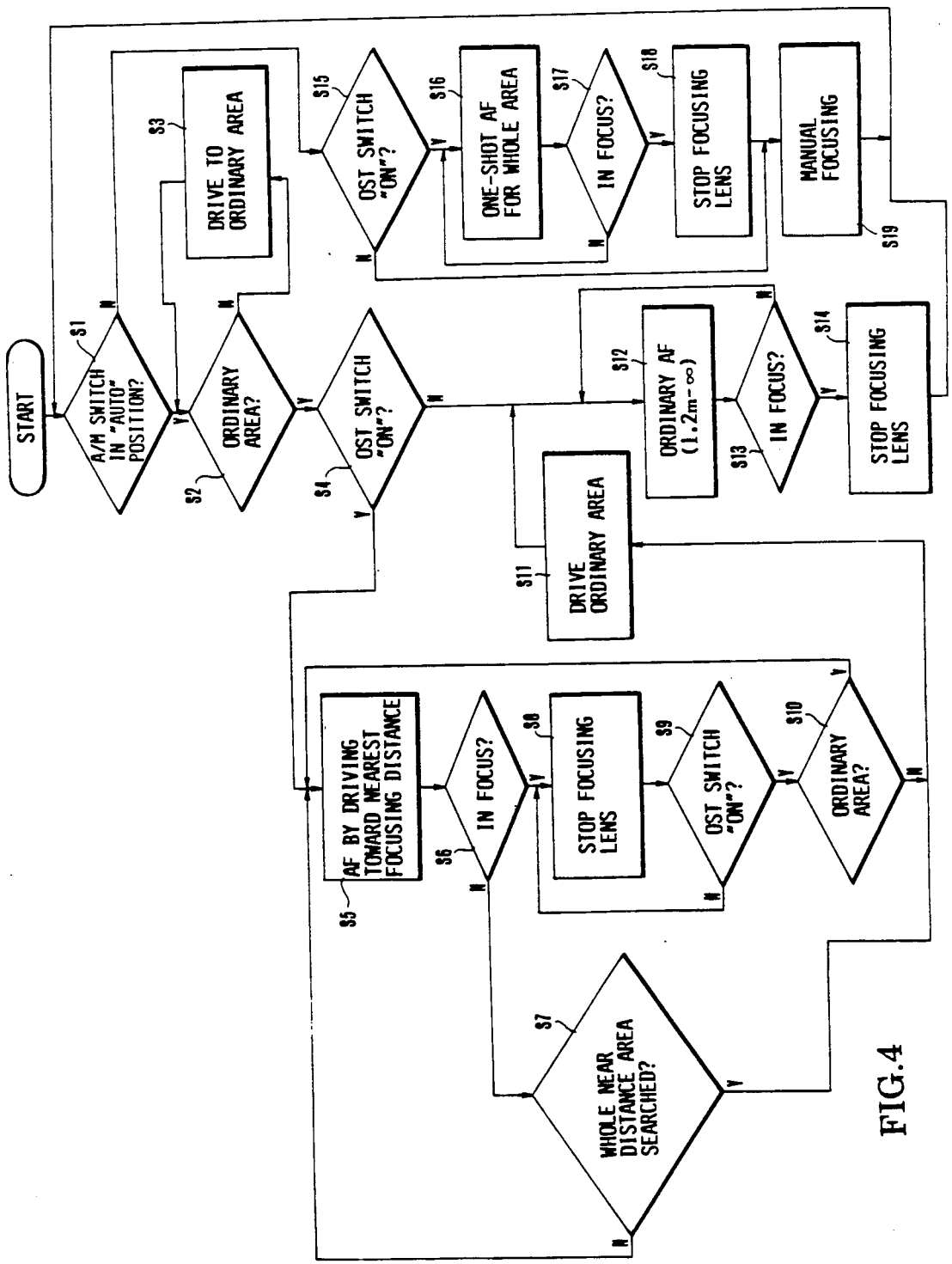
FIG. 4 is a flow chart showing the control algorithm of a focusing action performed according to this invention.

The automatic focus adjustment system according to this invention operates as described below with reference to FIGS. 3 and 4. FIG. 3 shows in patterns the focus adjusting actions performed according to the operating states of the A/M switch 19 and the OST switch 20 and the moving range of the focusing lens in each of the different operation modes. FIG. 4 is a flow chart showing the algorithm of control over the focusing action performed according to the operating states of the A/M switch 19 and the OST switch 20. The operation of the system is first briefly described as follows:

(1) With the automatic focusing mode selected by means of the A/M switch 19, if the OST switch 20 is off: The moving range of the focusing lens 1 for automatic focusing action is limited to the range from the infinite distance to the focusing distance 1.2 m. Under this condition, the automatic focusing action is performed in the ordinary mode. More specifically, the high-frequency component of the video signal part corresponding to the inside of the focus detection area set on the image sensing plane is extracted by the gate circuit 12 and the HPF 13 from the video signal output from the image sensor 10. Then, the peak level of the video signal part is detected in the cycle of one field period jointly by the detection circuit 14 and the peak hold circuit 15. Then, any change in the peak level is detected by the delay circuit 16 and the difference circuit 17. The change thus detected is converted into a digital signal through the A/D conversion circuit 18. The digital signal is supplied to the system control circuit 22. Meanwhile, the position of the focusing lens 1 and the aperture of the iris 7 are detected by the focus encoder 5 and the aperture encoder 8. The data from these encoders is also supplied to the system control circuit 22.

The system control circuit 22 analyzes, for every field, the data output from the A/D conversion circuit 18 indicating the change taking place in the peak hold value of the high-frequency component and the direction in which the change is taking place. The system control circuit 22 then supplies a control signal to the driving circuit 21 for moving the focusing lens 1 to an in-focus position according to the result of analysis. In other words, a difference in the peak hold value is detected for every field together with the polarity of the difference value. Then, according to the polarity, the focusing lens 1 is driven to move in the direction in which the currently detected peak value becomes larger than the previous peak value. An in-focus point where the peak hold value reaches a maximum value is detectable by detecting a point where the peak value difference eventually comes to show zero and begins to show a difference value in the opposite polarity. This focus detecting method is well known as "the hill climbing method" and therefore requires no further description.

In cases where the focusing lens 1 is to be stopped at an in-focus point on the nearest focusing distance side by moving the focusing lens 1 toward the nearest focusing distance side as will be described later. The focusing lens 1 is also stopped at a point where the high-frequency component which varies with the movement of the focusing lens 1 reaches the peak thereof by considering it as the in-focus point.

(2) When the A/M switch 19 is set in the manual focusing mode position while the OST switch 20 is in an off-state: Under this condition, the camera is in a manual focusing mode. The focusing lens 1 remains undriven. Focus adjustment is performed only manually.

(3) With the A/M switch 19 in the manual focusing mode position, if the OST switch 20 is on: The camera is in a so-called one-shot automatic focusing mode. In this mode, after the focusing lens 1 comes to a stop with an in-focus point attained, the focusing lens 1 is not driven again and there obtains the manual focusing mode. Under this condition, the focusing lens 1 is movable over the whole range from the infinite distance to the nearest focusing distance 0.6 m.

(4) When the A/M switch 19 is shifted to the automatic focusing mode position, if the position of the focusing lens 1 is within the near distance area ranging from 1.2 m to 0.6 m: The focusing lens 1 is automatically brought back to the ordinary area ranging from the infinite distance to 1.2 m.

(5) After that, when the OST switch 20 is turned on: The camera is set in an automatic focusing mode of nearest-focusing-distance priority. Then, the automatic focusing action is performed on the nearest focusing distance side of the position in which the focusing lens 1 is currently located.

When the OST switch 20 is again turned on: The focusing lens 1 is further moved toward the nearest focusing distance side to be focused on an object located at a distance still closer to the nearest focusing distance.

(6) When an in-focus point is attained within the near distance area ranging from 1.2 m to 0.6 m: The system differently acts in response to turning-on of the OST switch 20, and the focusing lens 1 is brought back to the ordinary area ranging from the infinite distance to the focusing distance 1.2 m. This action may be arranged to be performed after arrival of the focusing lens at the position of the nearest focusing distance 0.6 m.

Further, in a case where no focusable object is found within the near distance area, the position of the focusing lens is shifted back to the ordinary area ranging from the infinite distance to the focusing distance 1.2 m.

The responsivity of the system can be enhanced by causing the focusing lens driving motor 2 to drive the focusing lens 1 at the highest speed thereof while a search is made for any object located at a nearer distance after change-over from the ordinary-area automatic focusing mode to the automatic focusing mode of nearest-focusing-distance priority.

The focusing lens moving range can be switched from one area over to the other by means of the OST switch 20 as mentioned above. Therefore, even in a case where the lens comes to a stop at a false in-focus position due to spurious resolution, the focusing lens can be set to a true in-focus position by operating the OST switch 20 to move the focusing lens still toward the nearest focusing distance or to change the focusing lens moving area from one area over to the other.

(7) With the A/M switch 19 in the automatic focusing mode position, if the position of the focusing lens 1 is within the area for the distance range from the infinite distance to the focusing distance 1.2 m: The focusing lens can be moved to the near distance area for the distance range from 1.2 m to 0.6 m at the highest speed by turning the OST switch 20 on.

The above-stated operation of the embodiment is further described as follows with reference to FIG. 4 which shows operation control in a flow chart:

At a step S1: After the start of the control flow, a check is made for the position of the A/M switch 19 to make a discrimination between selection of the automatic focusing mode and the manual focusing mode. If the automatic focusing mode is selected, the flow comes to a step S2. At the step S2: The position of the focusing lens 1 is checked to find whether it is in the ordinary area for the distance range from the infinite distance to the focusing distance 1.2 m or in the near distance area for the distance range from 1.2 m to 0.6 m. If the focusing lens is found not in the ordinary area, the flow comes to a step S3. At the step S3: The focusing lens 1 is driven and moved to the ordinary area. If the focusing lens is found to be in the ordinary area at the step S2, the flow comes to a step S4. At the step S4: A check is made to see if the OST switch 20 is "on" or "off". If the OST switch 20 is found to be off, the flow comes to a step S12. Steps S12, S13 and S14: A search is made for an in-focus point within the ordinary area for the distance range from the infinite distance to the focusing distance 1.2 m and the automatic focusing action (AF) is performed. The focusing lens 1 is then brought to a stop at an in-focus point. After that, the flow comes back to the step S1 to perform control according to the position of the A/M switch 19.

In a case where the OST switch 20 is found to be "on" at the step S4, the flow comes to a step S5. At the step S5: The system is set in the automatic focusing mode of nearest-focusing-distance priority. The focusing lens 1 is driven toward the nearest focusing distance. Steps S6 and S8: The focusing lens 1 is brought to a stop at an in-focus point upon detection of an in-focus state. In the automatic focusing mode of nearest-focusing-distance priority, the focusing lens 1 is moved from its current position toward its the nearest focusing distance and is brought to a stop at a point where the peak value of the high-frequency component is detected. After the step S8, the flow comes to a step S9. At the step S9: A check is made for the position of the OST switch 20. If the OST switch 20 is found to be "on", the flow comes to a step S10. At the step S10: A check is made for the area in which the focusing lens is currently located. If the area is found to be the ordinary area, the flow comes back to the step S5 to have the focusing lens 1 further driven to an in-focus point on the nearer distance side of the area. Further, if the area is found to be the near distance area instead of the ordinary area, the flow comes to a step S11. At the step S11: The focusing lens 1 is driven to move to the ordinary area and the flow comes back to the automatic focusing action to perform it within the ordinary area.

In a case where no in-focus point is detected at the step 6 during the process of the automatic focusing mode of nearest-focusing-distance priority, the flow branches from the step S6 to a step S7. At the step S7: A check is made to find whether no in-focus point is detected by searching the whole near distance area for the distance range from 0.6 m to 1.2 m or whether the search within that area has not been completed as yet. If the search within the whole near distance area is found to have been not completed, the flow comes back to the step S5 to further continue the automatic focusing mode of nearest-focusing-distance priority. After that, if no in-focus point is found to be still detectable, the flow comes to the step S11 to bring the focusing lens 1 back to the ordinary area. Then, the automatic focusing action is performed within the ordinary area.

The control action described above is repeated according to the position of the A/M (automatic-manual selection) switch 19 and that of the OST switch 20.

More specifically, when the manual focusing mode is selected, focus of the lens is adjusted by moving focusing lens 1 over the whole area including the ordinary and near distance areas for the distance ge from the infinite distance to the nearest focusing distance 0.6 m. When the OST switch 20 is turned on in the manual focusing mode, the automatic focusing action is performed once but is not performed again after an in-focus state is attained (one shot AF) and the system is set in the manual focusing mode thereafter.

Further, with the automatic focusing mode selected, if the OST switch 20 is "off", the automatic focusing action is performed within the ordinary area for the distance range from the infinite distance to the focusing distance 1.2 m. Then, if the OST switch 20 is turned on under this condition, the system is set in the automatic focusing mode of nearest-focusing-priority in which the focusing lens 1 is driven toward the nearest focusing distance until it reaches an in-focus point. After that, when the OST switch 20 is again turned on, if the focusing lens 1 is within the ordinary area, the focusing lens 1 is moved further toward the nearest focusing distance to make a search for an in-focus point on the near distance side. If the focusing lens 1 is within the near distance area under that condition, the focusing lens 1 is moved to the ordinary area and the system resumes the ordinary automatic focusing mode to perform automatic focusing within the ordinary area.

Figure 5:
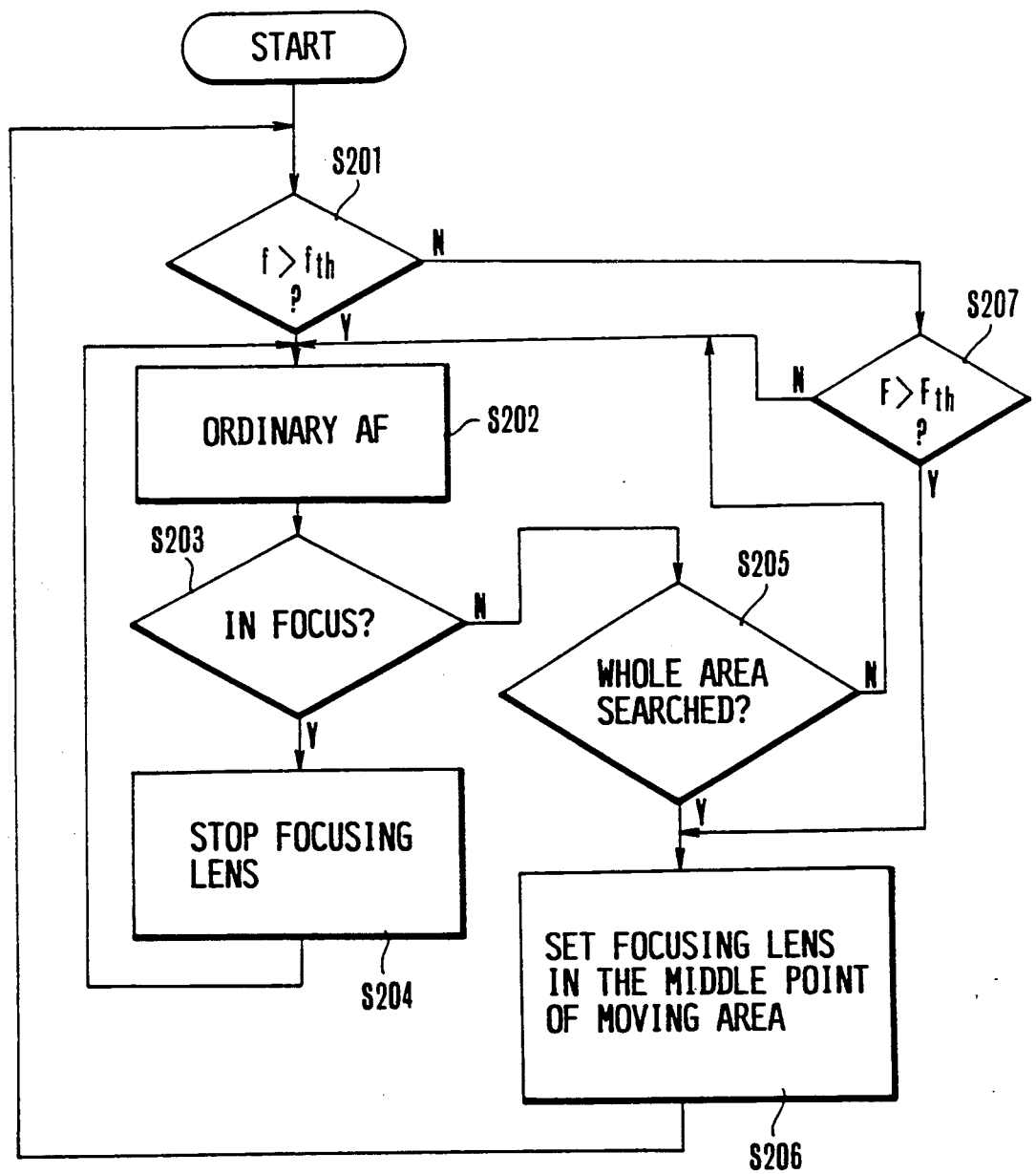
FIG. 5 is a flow chart showing a focusing action performed with the depth of field taken into consideration.

FIG. 5 is a flow chart showing procedures for control to be performed over the focusing action by taking into consideration the depth of field and the conditions of the object to be shot. This control applies to a case where a zoom lens is employed as the photo-taking optical system and where the focal length is obtained on the wide-angle side of the lens under such conditions that the iris is stopped down to a sufficiently small aperture position and the depth of field is deep; or the contrast of the object is too low for detecting the maximum value of the high-frequency component within the moving area of the focusing lens.

At the step S201 of FIG. 5: After the start of the automatic focusing action, the focal length f of the optical system is compared with a given value fth. If the focal length f is larger than the value fth, the flow of control procedures comes to a step S202. At the step S202: The automatic focusing action is performed in the ordinary hill-climbing method to move the focal lens 1 to a in-focus point where the high-frequency component reaches its maximum level. At a step S203: A check is made for an in-focus state. If the in-focus state is detected, the flow comes to a step S204. At the step S204: The focusing lens 1 is brought to a stop. The flow then comes back to the step S202. If the optical system is found not in focus at the step S203, the flow comes to a step S205. At the step S205: A check is made to find whether the in-focus point, where the high-frequency component reaches a maximum value, is not detected from the whole focusing lens moving area or whether the search for the in-focus point within the lens moving area has not been completed. If it is found that the lens is still being moved in search of the in-focus point within the lens moving area, the flow comes back to the step S202 to resume the automatic focusing action. In a case where the maximum value of the high-frequency component is not obtained while moving the focusing lens over the whole moving area due to the low contrast of the object, the flow comes to a step S206. At the step S206: The focusing lens 1 is moved to the middle point of the moving area and the flow comes back to the step S201.

Further, in a case where the focal length f is found to be less than the given value fth at the step S201, thus indicating that the zoom lens is in a position on its wide-angle side, the flow comes to a step S207. At the step S207: The aperture value F of the iris is compared with a given value Fth. If the aperture value F is not greater than the value Fth, thus indicating not an extremely small aperture, the maximum value of the high-frequency component is considered to be detectable. The flow then comes to the step S202 to perform the automatic focusing action. If the aperture value F is found to be greater than the given value Fth, thus indicating a very small aperture, the depth of field is considered, in relation to the focal length f, to be very deep and there is a great probability that the maximum value of the high-frequency component is undetectable. In the latter case, therefore, the flow comes to a step S206 to move the focusing lens 1 and stop it in the middle point of the moving area.

The focal length of the lens and the aperture value are detected and the lens is thus controlled according to the depth of field and the contrast of the object. The automatic focusing action is performed if the in-focus state of the lens is detectable. In a case where the in-focus state is not detectable, the focusing lens is set in an intermediate position to give a state which is not much defocused both on the side of the infinite distance and on the side of the nearest focusing distance. This arrangement enables automatic focus adjustment to be accurately, promptly and adequately carried out.

In the case of this embodiment, the focusing lens is arranged to be brought to a stop at a point for a distance of 2.4 m within the ordinary area for the distance range from the infinite distance to the nearest focusing distance 1.2 m; at a point for a distance of 0.8 m within the near distance area for the distance range from 1.2 m to 0.6 m; and at a point for a distance of 1.2 m within the whole area for the distance range from the infinite distance to 0.6 m.

The flow of control shown in FIG. 5 is of course compatible with and usable along with each of the automatic focusing actions shown in FIG. 4.

Figure 6:
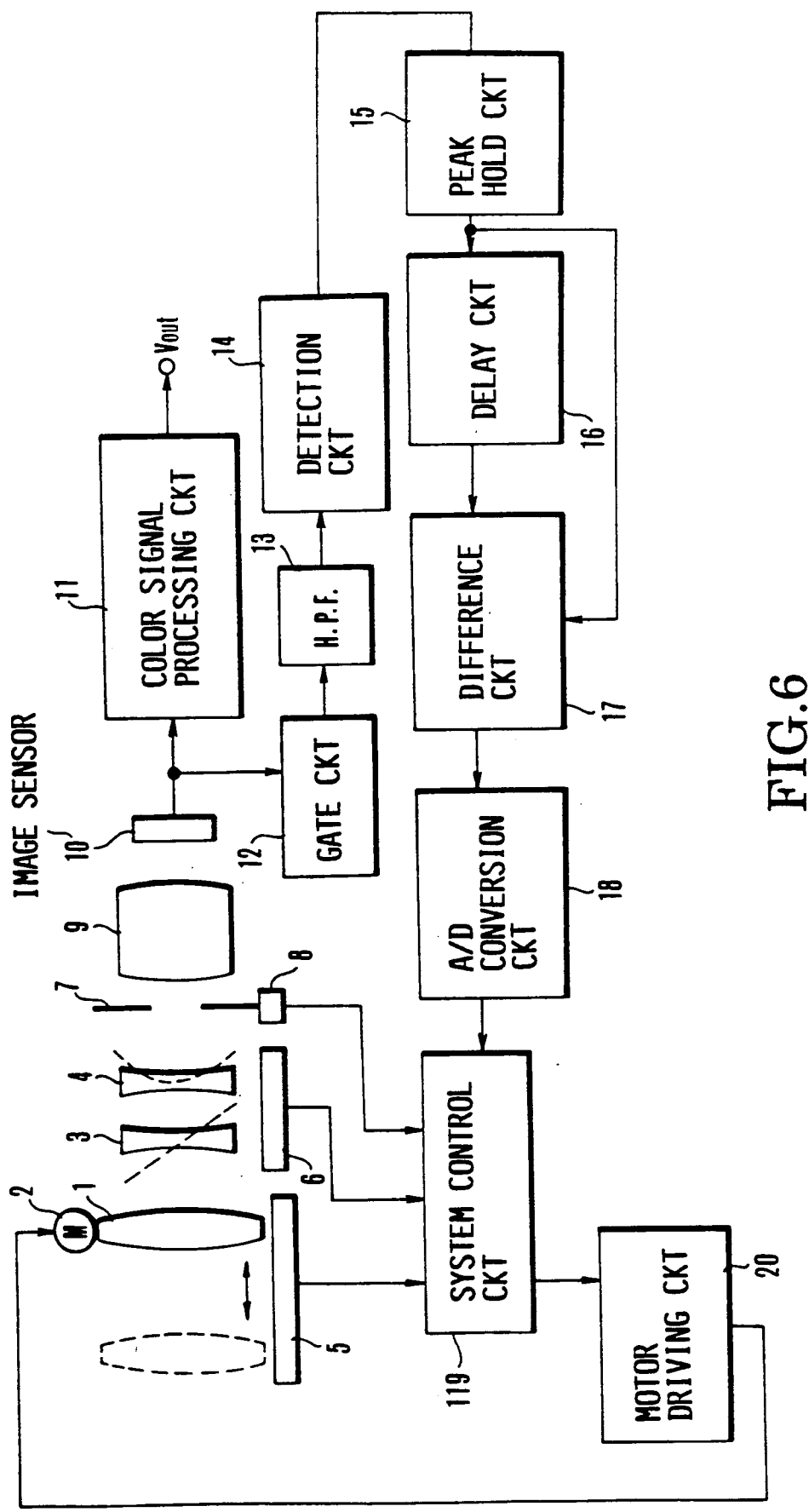
FIG. 6 is a block diagram showing a focus adjustment system arranged according to this invention as a second embodiment thereof.

FIG. 6 is a block diagram showing an automatic focusing system which is arranged also according to this invention as a second embodiment thereof. In the case of the second embodiment, the OST switch 20 of the first embodiment is omitted. The second embodiment is arranged to detect the position of the focusing lens 1 and to perform the automatic focusing action according to the area in which the position of the focusing lens 1 is located. This function is accomplished in accordance with a control algorithm stored in a system control circuit 119. In FIG. 6, the same component parts as those of the first embodiment shown in FIG. 1 are indicated by the same reference numerals and they are omitted from description.

A more specific description of the second embodiment is as follows: When the focusing lens 1 is manually moved from one area in which it is currently located to the other area, the change of the moving area is detected by detecting the position of the focusing lens. The automatic focusing action is then automatically changed to be apposite to the new area.

Figure 7:
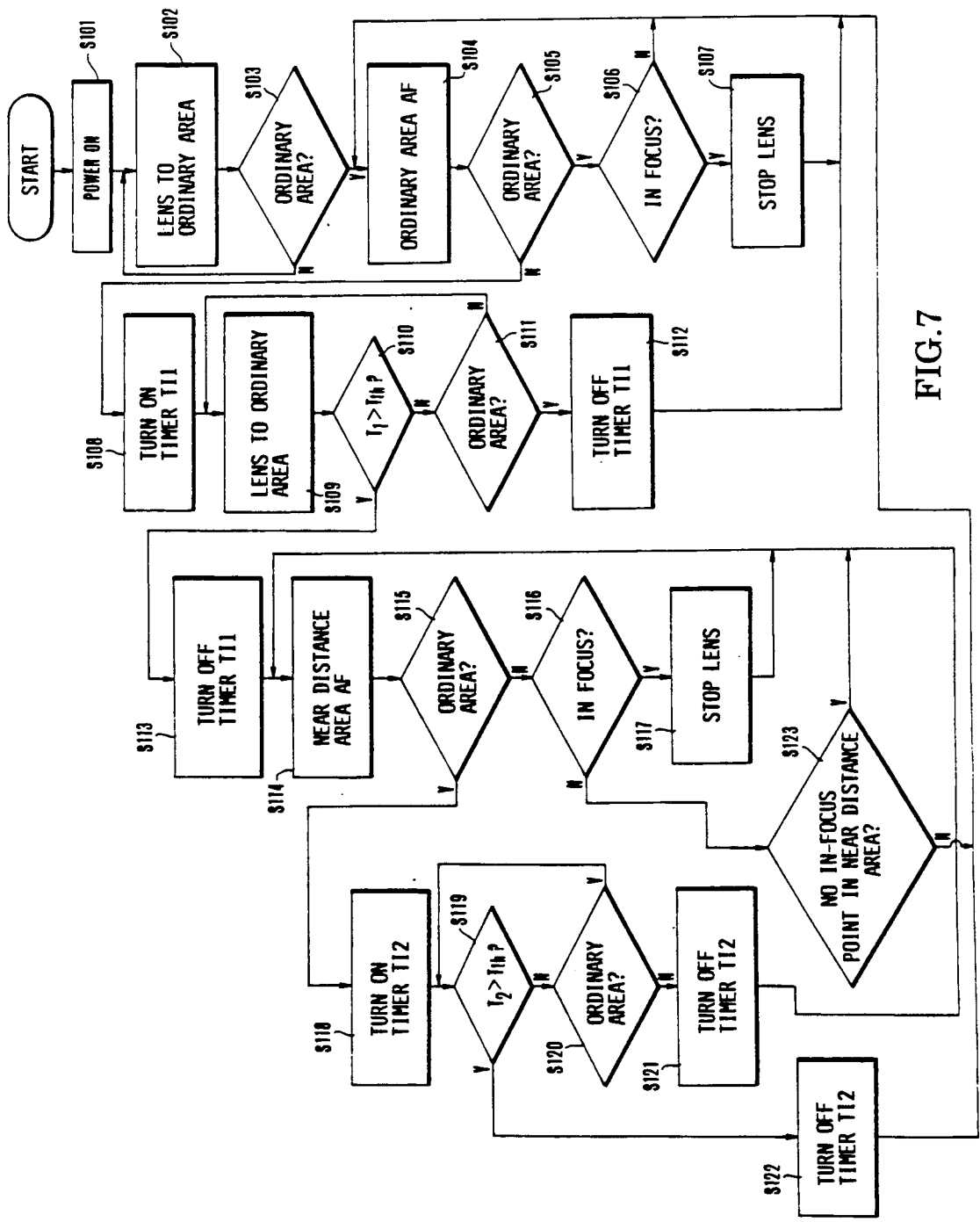
FIG. 7 is a flow chart showing the control algorithm of the second embodiment.

FIG. 7 is a flow chart showing the control algorithm of the system control circuit, 119 of the second embodiment. Referring to FIG. 7, the control algorithm is as follows: At a step S101: The power supply of the system is switched on. Steps S102, S103 and S104: The position of the focusing lens 1 is moved to the ordinary area for the distance range from the infinite distance to the focusing distance 1.2 m. The automatic focusing action begins within the ordinary area after confirmation of the movement of the focusing lens 1 to the ordinary area. The flow then comes to a step S105. At the step S105: A check is made through the detection value of the focus encoder 5, for example, for the position of the focusing lens as to whether it is located within the ordinary area for the distances between the infinite distance and the focusing distance 1.2 m or within the near distance area for the distance range from 1.2 m to 0.6 m. This detecting action may be done also by means of, for example, a micro switch arranged to be turned on and off by the movement of the focusing lens, some optical sensor, such as a photo coupler, or a magnetic sensor, such as a reed switch or the like.

If the focusing lens 1 is found to be located within the ordinary area at the step S105, the flow comes to a step S106. At the step S106: A check is made to see if the lens is in an in-focus state. If not, the flow comes back to the step S104 to continue the automatic focusing action within the ordinary area. If the in-focus state is confirmed at the step S106, the flow comes to a step S107. At the step S107: The focusing lens 1 is brought to a stop. The flow come back to the step S104. Then, if the lens again comes out of focus, the above-stated steps of flow are repeated to restart the automatic focusing action.

Steps S108 to S122 are provided for a control action to be performed in a case where the focusing lens 1 is found to have come to the outside of the ordinary area at the step S105. During the process of automatic focusing within the ordinary area, the focusing lens moves from the ordinary area to the near distance area provided for distances from 0.6 m to 1.2 m either in a case where no in-focus point is found within the ordinary area or when the focusing lens is manually forced to move from the ordinary area to the near distance area. In the former case, the embodiment is arranged to promptly bring the focusing lens back to the ordinary area to resume the automatic focusing action within the ordinary area. In the latter case, the control mode is changed to cause the automatic focusing action to be performed within the near distance area.

In other words, the second embodiment is arranged as follows: When the focusing lens is manually forced to move from the ordinary area to the near distance area and vice versa, the automatic focusing mode is also shifted to a mode apposite to the new area. In a case where the focusing lens is temporarily moved from one area to the other area, with no in-focus point found, and then comes back to the original area, the automatic focusing mode is kept unchanged.

In the case of the second embodiment, a discrimination between the two automatic focusing modes is made by measuring, with a timer, a period of time during which the focusing lens remains in the new area after it is moved from one area to the other area. In a case where the focusing lens is located within the ordinary area and then comes to be momentarily moved to the near distance area, it comes back in a very short period of time. In that case, the focusing lens is allowed to stay within the near distance area only for a period of time not exceeding 100 msec. Whereas, in the event of manual movement, the focusing lens is generally allowed to be held within the near distance area for a period of time more than 300 msec. Therefore, a threshold value is set, for example, at 200 msec. When the focusing lens moving area is changed, the period of time for which the lens is allowed to stay within the new are after the change is compared with the threshold value. The above-stated discrimination then can be made by the result of the comparison. The details of the control action are as described below:

When the movement of the focusing lens from the ordinary area to the near distance area is found at the step S105, the flow comes to a step S108. At the step S108: A timer TI1 which is arranged within the system control circuit 119 begins to perform a counting action. Step S109: At the same time, the focusing lens is driven to move to a given extent toward the ordinary area. At a step S110: Following this, a period of time T1 lapsed after the start of the timer TI1 is compared with a given threshold value Tth. If the time T1 is found to be equal to or less than the threshold value Tth, the flow comes to a step S111. At the step S111: A check is made for the area in which the focusing lens is currently located. If the focusing lens is found to be still in the near distance area, the flow comes back to the step S109 to move the focusing lens further to the ordinary area and, at the step S110, to compare the time T1 of the timer TI1 with the threshold value Tth. At the step S111, if the focusing lens is found to have reached the ordinary area before the time T1 of the timer TI1 reaches the value Tth, the flow comes to a step S112. At the step S112: The timer TI1 is reset and turned off. Then, the flow comes back to the step S104 to cause the automatic focusing action performed in the ordinary area.

In cases where the lapsed time T1 is found at the step S110 to have exceeded the threshold time Tth while the focusing lens still remains within the near distance area, i.e., before it comes to the ordinary area, the flow comes to a step S113. At the step S113 and ensuing steps, the automatic focusing action is performed within the near distance area in the following manner: At the step S113, the timer TI1 is turned off. At a step S114: The focusing lens is moved to an infocus point within the near distance area.

In the case of the second embodiment, the focus adjustment system is arranged to cause the focusing lens to be moved again to the ordinary area, if an in-focus state is not obtained within the near distance area. Therefore, at a step S115: A check is made for the ordinary area. If the focusing lens is found to be within the near distance area, the flow comes to a step S116. At the step S116: A check is made to see if an in-focus state is obtained. If so, the flow comes to a step S117. At the step S117: The focusing lens is brought to a stop and the flow comes back to the step S114. In a case where the lens is found to be out of focus within the near distance area, the automatic focusing action is performed again. If the lens is found to be out of focus at the step S116, therefore, the flow comes to a step S123. At the step S123: A check is made to determine whether no in-focus point is found throughout the whole near distance area or the focusing lens is still being moved within the near distance area in search of an in-focus point. In the former case, the flow comes back to the step S104 to perform the automatic focusing action within the ordinary area. In the latter case, the flow comes back to the step S114 to further conduct the search for an in-focus point within the near distance area.

In a case where the focusing lens is found at the step S115 to have been moved from the near distance area to the ordinary area, the flow comes to a step S118. At the step S118: A timer TI2 is rendered operative and is allowed to begin to count. The flow comes to a step S119. At the step S119: A lapsed period of time T2 as counted by the timer TI2 is compared with the threshold time Tth. If the time T2 has not reached the value Tth, the flow comes to a step S120. At the step S120: A check is made for the area in which the focusing lens is currently located. If the focusing lens is thus found not to have returned to the near distance area, the flow comes back to the step S119 to further count the time for which the focusing lens is located within the ordinary area. If the focusing lens is found to have returned to the near distance area at the step S120, the flow comes to a step S121. At the step S121: The timer TI2 is reset. The flow comes back to the step S114 to perform the automatic focusing action within the near distance area.

In a case where the lapsed time T2 is found at the step S119 to have exceeded the threshold value Tth after the focusing lens is moved to the ordinary area, the flow comes to a step S122. At the step S122: The timer TI2 is stopped and reset. The flow then comes back to the step S104 to perform the automatic focusing action within the ordinary area.

Further, the control algorithm which is arranged in consideration of the depth of field and the low degree of contrast as shown in FIG. 5 is compatible with the control algorithm of the second embodiment described above.

As described in the foregoing, the focus adjustment system according to this invention is arranged to divide the moving range of the focusing lens into two areas, including the ordinary area in which focus adjustment is carried out in an ordinary manner and the near distance area in which focus adjustment can be carried out for a range of distances nearer than the focusable distances covered by the ordinary area. The mode of the focusing action is switched from one mode over to another according to shooting conditions. Therefore, the automatic focusing action can be promptly controlled, without being affected by spurious resolution and in a manner apposite to the shooting conditions for any object to be shot, particularly for an object located close to the lens.

What is claimed is:

1. An automatic focus adjustment system comprising:
    a) focus adjusting means for varying an image forming position; and
    b) control means for selectively setting a first focusing mode in which said focus adjusting means is moved to an in-focus point within a moving area thereof on the basis of a signal according to the degree of focusing and a second focusing mode of nearest-focusing-distance priority in which said focus adjusting means is moved to an in-focus point while being driven toward the nearest focusing distance side,
    wherein said control means causes a moving range of said focus adjusting means to differ between said first focusing made and said second focusing mode.

2. A system according to claim 1, wherein said control means is arranged to divide the moving range of said focus adjusting means into a first area and a second area which is set on the nearest focusing distance side of said first area, and to change over a moving area of said focus adjusting means according to the setting of said first focusing mode or said second focusing mode.

3. A system according to claim 2, wherein said control means is arranged to make said focus adjusting means movable within said first area in said first focusing mode and to make said focus adjusting means movable within said first area and said second area in said second focusing mode.

4. A system according to claim 1, wherein said control means is arranged to drive said focus adjusting means at a highest speed when said first focusing mode is shifted to said second focusing mode.

5. A system according to claim 1, wherein said control means is arranged to move said focus adjusting means to an in-focus point on the nearest focusing distance side every time an operation switch is operated in said second focusing mode.

6. A system according to claim 3, wherein said control means is arranged to move said focus adjusting means to said first area and to change the focusing mode when no in-focus state is obtained within said second area.

7. A system according to claim 2, wherein said control means is arranged to bring said focus adjusting means to a stop in a predetermined position when no in-focus point is detectable within said first or second area.

8. A system according to claim 7, wherein the position at which said focus adjusting means is brought to a stop when no in-focus state is obtainable is set according to the area in which the focus adjusting means is located.

9. A system according to claim 3, wherein said control means is arranged to change the control of said focus adjusting means according to the position of mode change-over means and the state of operation means.

10. A system according to claim 9, wherein said mode change-over means is an automatic/manual selection switch.

11. An automatic focus adjustment system comprising:
a) focus adjusting means for adjusting focus by varying an image forming position on the basis of a signal according to the degree of focusing;
b) switching means for switching a moving range of said focus adjusting means between a first moving area and a second moving area which is set on the nearest focusing distance side of said first moving area; and
c) control means for forcibly shifting said focus adjusting means from one area of said first and second moving areas to the other area.

12. A system according to claim 11, wherein said control means is arranged to divide the moving range of said focus adjusting means into a first area and a second area which is set on the nearest focusing distance side of said first area, and to change over a moving area of said focus adjusting means according to the setting of said first focusing mode or said second focusing mode.

13. A system according to claim 12, wherein said control means is arranged to make said focus adjusting means movable within said first area in said first focusing mode and to make said focus adjusting means movable within said first area and said second area in said second focusing mode.

14. A system according to claim 11 or 13, wherein said control means is arranged to drive said focus adjusting means at a highest speed when the moving area of said focus adjusting means is changed from one area over to the other.

15. A system according to claim 11, wherein said control means has a mode in which the moving area of said focus adjusting means is changed from one area to the other area when focus adjustment is impossible within the moving area in which said focus adjusting means is currently located.

16. A system according to claim 11, wherein said control means is arranged to stop said focus adjusting means in a predetermined position when focus adjustment is impossible.

17. A system according to claim 16, wherein the position at which said focus adjusting means is brought to a stop when on in-focus state is obtainable is set according to the area in which the focus adjusting means is located.

18. A system according to claim 13, wherein said control means is arranged to change the control of said focus adjusting means according to the position of mode change-over means and the state of operation means.

19. A system according to claim 18, wherein said mode change-over means is an automatic/manual selection switch.

20. An automatic focus adjustment system comprising:
a) focus adjusting means which is movable in a first area and a second area for focus adjustment by varying an image forming position;
b) detecting means for detecting an area in which said focus adjusting means is located; and
c) control means arranged to determine an area to which said focus adjusting means is to be moved according to the length of time for which said focus adjusting means is held within a current area following detection of movement of said focus adjusting means to said current area by said detecting means.

21. A system according to claim 20, wherein said control means is arranged to divide the moving range of said focus adjusting means into a first area and a second area which is set on the nearest focusing distance side of said first area, and to change over a moving area of said focus adjusting means according to the setting of said first focusing mode or said second focusing mode.

22. A system according to claim 21, wherein said control means is arranged to make said focus adjusting means movable within said first area in said first focusing mode and to make said focus adjusting means movable within said first area and said second area in said second focusing mode.

23. A system according to claim 20, further comprising operation means for forcibly driving said focus adjusting means.

24. A system according to claim 23, wherein said operation means is manualoperation means.

25. A system according to claim 20, wherein said focus adjusting means is arranged to perform focus adjustment on the basis of the level of a signal component which varies according to a focusing state of an image signal obtained by photo-electric converting an object image, said signal component being included in said image signal.

* * * * *